Dec. 19, 1939.   P. F. HAWLEY   2,183,565
TWO-WELL METHOD OF ELECTRICAL LOGGING AND APPARATUS THEREFOR
Filed May 27, 1938

INVENTOR
Paul F. Hawley
BY
Geo. L. Parkhurst
ATTORNEY

Patented Dec. 19, 1939

2,183,565

UNITED STATES PATENT OFFICE 2,183,565

TWO-WELL METHOD OF ELECTRICAL LOGGING AND APPARATUS THEREFOR

Paul F. Hawley, Tulsa, Okla., assignor to Stanolind Oil and Gas Company, Tulsa, Okla., a corporation of Delaware Application May 27, 1938, Serial No. 210,458

6 Claims. (Cl. 175—182)

This invention relates to a new method of and apparatus for electrically logging wells. More particularly it relates to a method in which two wells are utilized simultaneously.

Various methods are known to the art for the determination of the electrical properties of geological strata traversed by a bore hole. These methods are utilized for the electrical logging of wells, particularly for the electrical logging of oil wells and potential oil wells, in order to permit determination of the geological formations traversed by these wells and correlation of wells located in the same general area. In the past these electrical logging methods have in general utilized only a single well. I have found that new and advantageous results can be obtained by the use of two wells preferably located within a few hundred feet of each other.

The invention will become clear from a study of the accompanying drawing which forms a part of this specification and should be read in conjunction therewith and from a study of the following description which has particular reference to the drawing.

Broadly speaking, my invention contemplates disposing at least one electrode in each of at least two wells and then adjusting the levels of the electrodes in the various wells until the resistance between these electrodes reaches a maximum or a minimum as determined by suitable electrical equipment.

Figure 1:
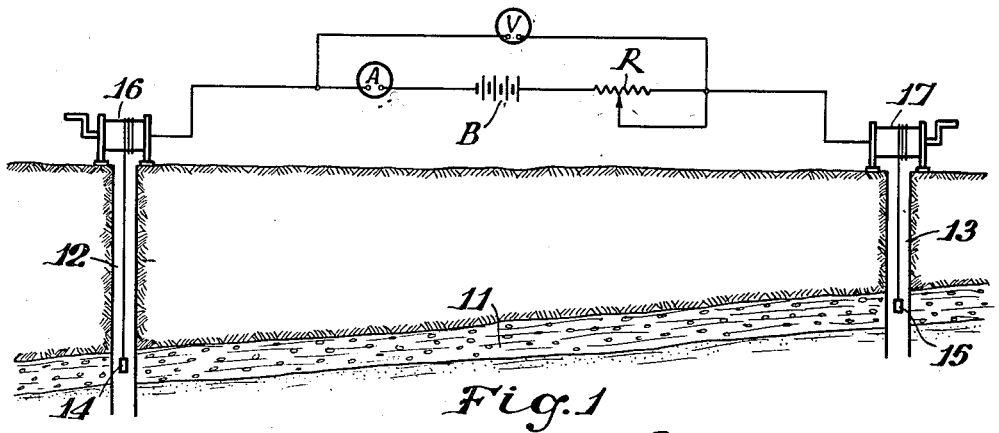
Figure 1 shows a simplified and idealized cross-section of a portion of the earth's crust together with one embodiment of apparatus used in accordance with my invention.

One simple form of apparatus useful in my invention is illustrated in Figure 1. In this figure one of the many strata forming part of the earth's crust is shown. This stratum 11 traverses the two uncased bore holes 12 and 13 within which are disposed electrodes 14 and 15 surrounded by the usual aqueous fluid. These electrodes can be raised and lowered by means of hoists 16 and 17. Electrodes 14 and 15 are electrically connected into a circuit which also includes ammeter A, potential source B and variable resistance R. A voltmeter V measures the voltage applied to the electrodes.

In accordance with my invention one of the well electrodes, for instance electrode 14, is held stationary while the other is raised or lowered until a minimum or maximum current flow is obtained as indicated by ammeter A. When a minimum current flow is encountered, it is indicative of the presence of a high resistance stratum between the two electrodes as would be the case in Figure 1 if stratum 11 were of this type. On the other hand, a maximum current flow would indicate that stratum 11 was of the low resistance or highly conductive type.

Obviously, this maximum or minimum current flow may be obtained even though electrode 14 is not directly in stratum 11 or in any event when it is not centrally located within this stratum. Assurance that the two electrodes are both disposed at corresponding positions in a stratum of high or low conductivity can be obtained by first adjusting one electrode to obtain a minimum or maximum current flow and then adjusting the other electrode in order to see whether a still lower or still higher value of current flow can be obtained. Thus, for instance, electrode 14 can be held stationary at the start and electrode 15 can be raised or lowered until a minimum or maximum is obtained. Electrode 14 can then be further raised or lowered until the operator is certain that a true minimum or maximum has been obtained.

When minimum or maximum current flow is obtained (always assuming constant voltage) the two electrode positions, which can readily be determined, provide an indication of the slope of this particular sub-surface formation of high or low resistance. From this information extrapolated by means of additional wells, a contour map of the sub-surface formation can be obtained with obvious advantages.

In order to obtain information concerning the actual character of the stratum which is being measured, voltmeter V, which gives the potential applied to the two electrodes, can be utilized to compute resistance. However, in order to compute the resistance of this particular stratum, corrections must be made for the voltage drops due to the flow of current through the conductors and to the contact potentials of the porous cups which are the usual electrodes.

Figure 2:
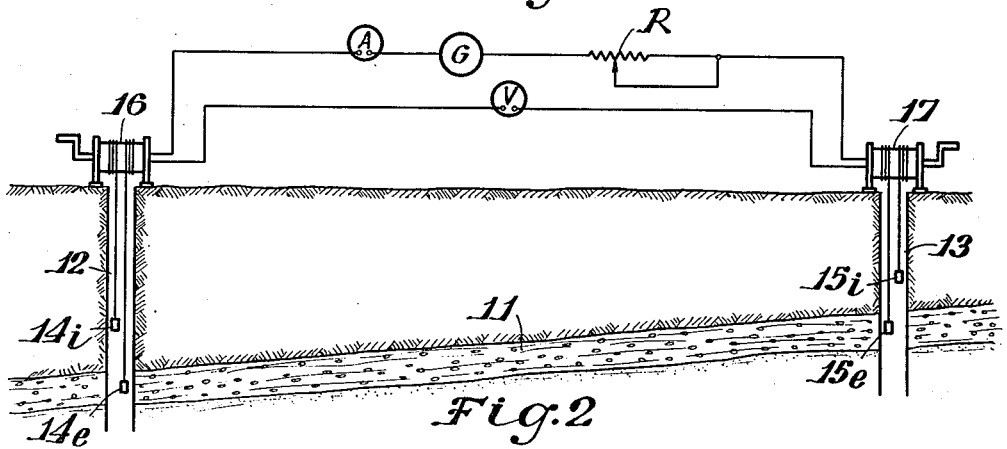
Figure 2 shows another cross-section of a portion of the earth's crust together with a modified form of apparatus useful in conjunction with my invention.

However, the necessity of correction for drop of potential through cables and porous cups can be eliminated by the arrangement shown in Figure 2. Here electrodes 14i and 15i carry the current traversing the stratum 11 while electrodes 14e and 15e serve as potential electrodes for determining the voltage. Electrodes 14i and 15i need not be of the porous pot variety but electrodes 14e and 15e should be of that type if a direct current source is used.

It is preferable, however, to use an alternating current source such as an alternating current generator G and when such a source is used porous pot electrodes are unnecessary.

Figure 3:
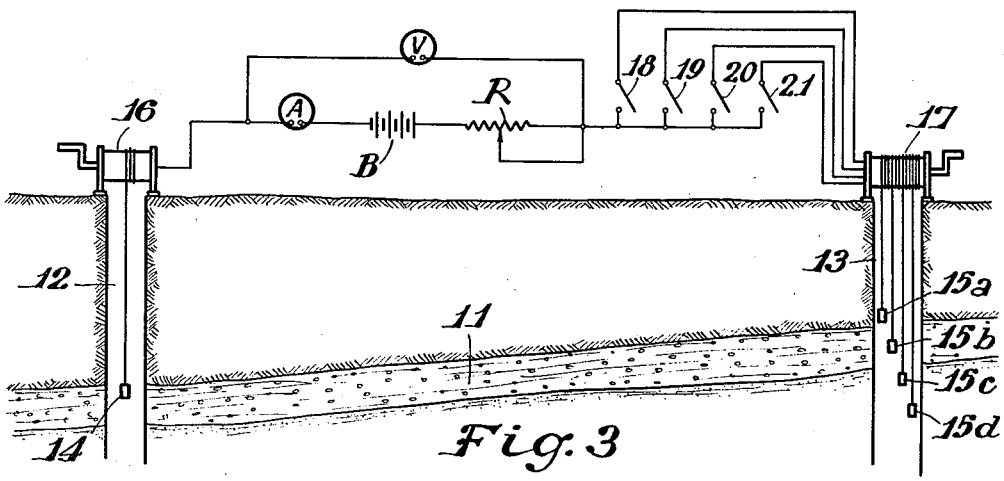
Figure 3 shows a still further modification of apparatus useful in conjunction with my invention.

The method thus outlined of adjusting the electrodes up and down the bore hole proves slightly tedious and time-consuming in practice and considerable time can be saved by having a plurality of electrodes in at least one of the bore holes distributed as to depth, for instance as shown in Figure 3. These various electrodes 15a, 15b, 15c and 15d can be connected in parallel by closing switches 18, 19, 20 and 21. Electrodes 15a, b, c and d can then be left in position in bore hole 13 while electrode 14 in bore hole 12 can be adjusted to find the location which gives a maximum or minimum reading on ammeter A. Then leaving electrode 14 in bore hole 12 at the depth thus determined, readings can be taken by the use of each of electrodes 15a, b, c and d separately. This can be done by closing switches 18, 19, 20 and 21 seriatim and taking a reading on ammeter A for each electrode. The electrode which gives the highest or lowest reading as the case may be is then chosen and a final adjustment can be made by moving this electrode up and down in the well to make certain that the reading is a true maximum or minimum.

My two-well method of electrical logging can be used in conjunction with other known methods of well logging and proves advantageous in this connection. Thus, for example, points of discontinuity in the underlying strata can be determined, for instance by the use of the method described in my co-pending patent application Serial No. 214,269, filed June 17, 1938, and an electrode can be placed in each of two bore holes midway between two correlated discontinuities. One or the other of these electrodes can then be adjusted up and down to obtain a maximum or minimum current reading after which a voltage reading can be taken in order to obtain the resistance from which the nature of the stratum can be determined. This two-well method can also be used advantageously to check and confirm correlations achieved by other means.

While the method of my invention is particularly applicable to use in connection with uncased bore holes, it can be used when one cased and one uncased bore hole are available. In this event one electrode or terminal is placed in contact with the casing of the cased bore hole and the other electrode in the uncased bore hole is raised or lowered until a maximum or minimum is obtained.

My invention has been described in connection with certain specific embodiments thereof but it is to be understood that these are by way of illustration and not by way of limitation and my invention should not be restricted thereto but only to the scope of the appended claims which should be construed as broadly as the prior art will permit.

I claim:

1. A method of electrical logging comprising establishing a current flow between a point in one well and a point in another well, and adjusting the vertical position of at least one of said points while measuring the current flow through a circuit including said points and the geological stratum or strata therebetween to determine at least one position of said points for minimum or maximum current flow between said two points.

2. A method of electrical logging comprising establishing a current flow between a point in one well and a point in another well, and adjusting the vertical positions of first one and then the other of said points while measuring the current flow through a circuit including said points and the geological stratum or strata therebetween to determine at least one position of said points for minimum or maximum current flow between said two points.

3. A method of electrically logging sub-surface formations traversed by at least two wells comprising locating at least one electrode in one well and at least one electrode in another well, applying a substantially fixed voltage to said electrodes in said two wells, measuring the current flow in the circuit which includes said electrodes, said voltage source and the geological stratum or strata between said electrodes in said two wells, and adjusting the vertical positions of said electrodes to obtain positions at which minimum or maximum current flow is obtained between said electrodes.

4. A method of electrically logging sub-surface formations traversed by at least two wells comprising locating at least one electrode in one well and a plurality of vertically spaced electrodes in another well, applying a substantially fixed votage to said electrodes in said two wells, measuring the current flow in the circuit which includes said electrodes, said voltage source and the geological stratum or strata between said electrodes in said two wells, and adjusting the vertical positions of said electrodes to obtain positions at which minimum or maximum current flow is obtained between said electrodes.

5. A method of electrically logging sub-surface formations traversed by at least two wells comprising locating at least one electrode in one well and a plurality of vertically spaced electrodes in another well, establishing a circuit including said at least one electrode in said one well, said vertically spaced electrodes in said other well, said last-mentioned electrodes being arranged in parallel in said circuit, a source of voltage, a current measuring instrument, and the geological stratum or strata between said electrodes in said two wells, measuring the current flow in said circuit, adjusting the positions of said electrodes in said two wells to obtain minimum or maximum current flow in said circuit, and then cutting all but one of said plurality of electrodes out of said circuit seriatim to determine which of said electrodes gives the minimum or maximum current flow.

6. A method of electrically logging sub-surface formations traversed by at least two wells comprising locating at least one electrode in one well and at least one electrode in another well, applying a voltage to said electrodes in said two wells, measuring said voltage, measuring the current flow in the circuit which includes said electrodes, said voltage source and the geological stratum or strata between said electrodes in said two wells, and adjusting the vertical positions of said electrodes to obtain positions at which minimum or maximum resistance in the geological stratum between said electrodes in said two wells is indicated by said voltage and current measurements.

PAUL F. HAWLEY.